United States Patent [19]

Lucey et al.

[11] Patent Number: 6,097,809
[45] Date of Patent: *Aug. 1, 2000

[54] ADJUSTABLE TELEPHONE HEADSET

[75] Inventors: Robert E. Lucey, Sudbury, Mass.; John Ela, Atkinson, N.H.; Christopher O. Lada, Palo Alto, Calif.; Lawrence G. Shubert, Palo Alto, Calif.; Christopher Loew, San Francisco, Calif.

[73] Assignee: UNEX Corporation, Nashua, N.H.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/668,599

[22] Filed: Jun. 18, 1996

Related U.S. Application Data

[60] Continuation of application No. 08/505,115, Jul. 21, 1995, abandoned, which is a division of application No. 08/231,981, Apr. 21, 1994, Pat. No. 5,446,788, which is a continuation of application No. 07/952,967, Sep. 29, 1992, abandoned.

[51] Int. Cl.⁷ .................................................. H04M 1/00
[52] U.S. Cl. ............................................................. 379/430
[58] Field of Search ........................... 379/430; 381/370, 381/374, 376, 379, 381

[56] References Cited

U.S. PATENT DOCUMENTS 5,260,997  11/1993  Gattey et al. ............................ 379/430

Primary Examiner—Jack Chiang
Attorney, Agent, or Firm—Weingarten, Schurgin, Gagnebin & Hayes LLP

[57] ABSTRACT

A telephone headset including a boom microphone, a earphone, and an ear support constructed and arranged to be adjustable and comfortable for a wearer. The headset is configured with an adjustable ear support to fit a variety of ear sizes without affecting the balance of the ear support on the ear of the wearer. The ear support includes a rotational hinge which is biased into a given position by a compression washer. The earphone is removably and adjustably attached to a mounting ring which in turn is movably attached to the ear support by a spring biased ball and socket joint. The combination of flexible joints and removability of the earphone provides the degrees of freedom and stiction necessary to permit the earphone to be worn comfortably on either ear of the wearer. A strain relief for the electrical connections is attached to the earphone which directs the electrical connections toward the plane of the head, thereby eliminating a torque which otherwise would tend to dislodge the ear support from the ear. The earphone includes a series of openings in its rear surface to maximize its acoustics. The boom microphone includes a spring biased ball and socket joint to movably fix the orientation of the microphone with respect to the wearer to a good comfort level. The boom microphone ball and socket joint is configured with a tab and stop to prohibit 360 degree rotation of the boom to prevent strain on the electrical connections to the microphone.

2 Claims, 6 Drawing Sheets

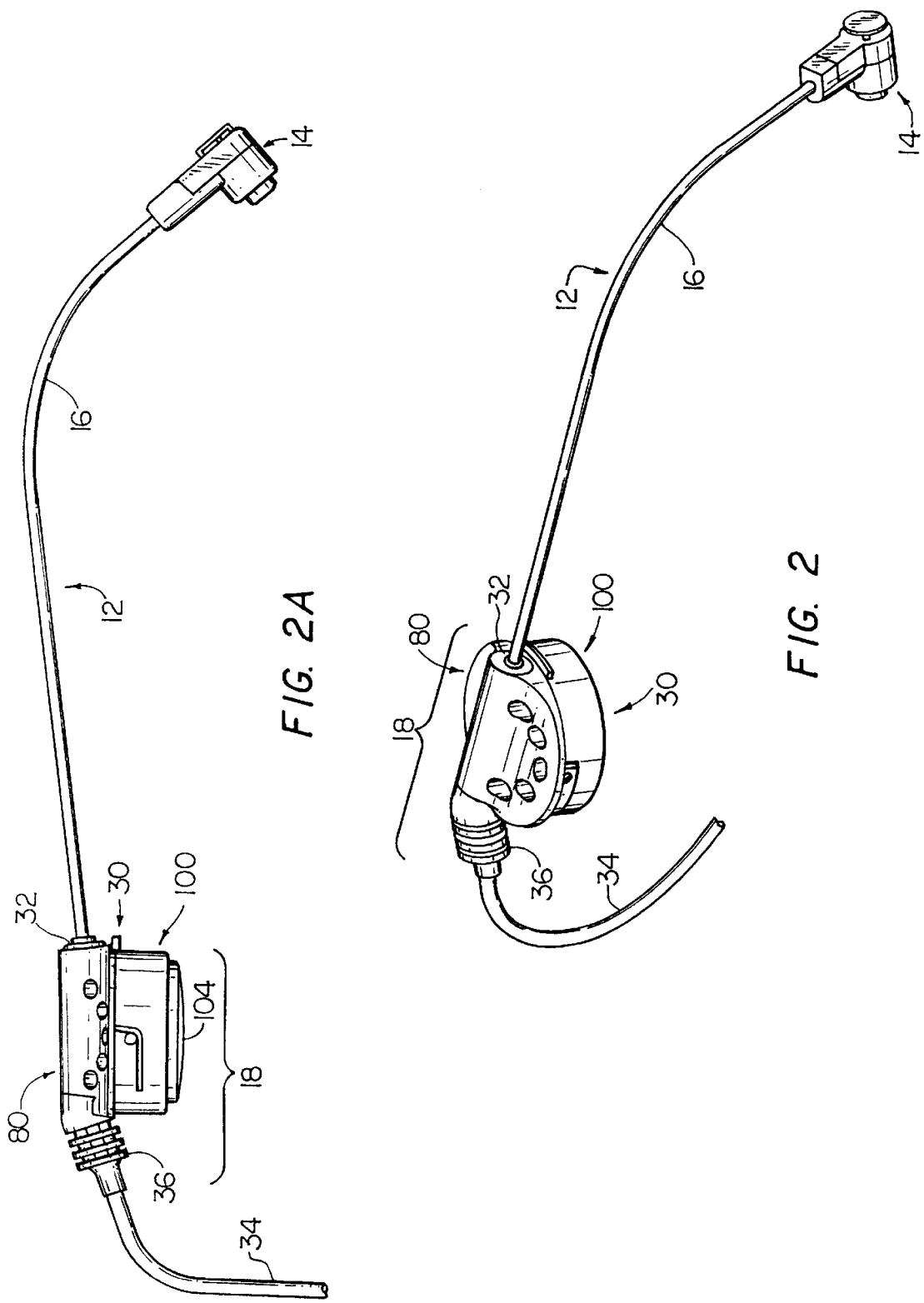

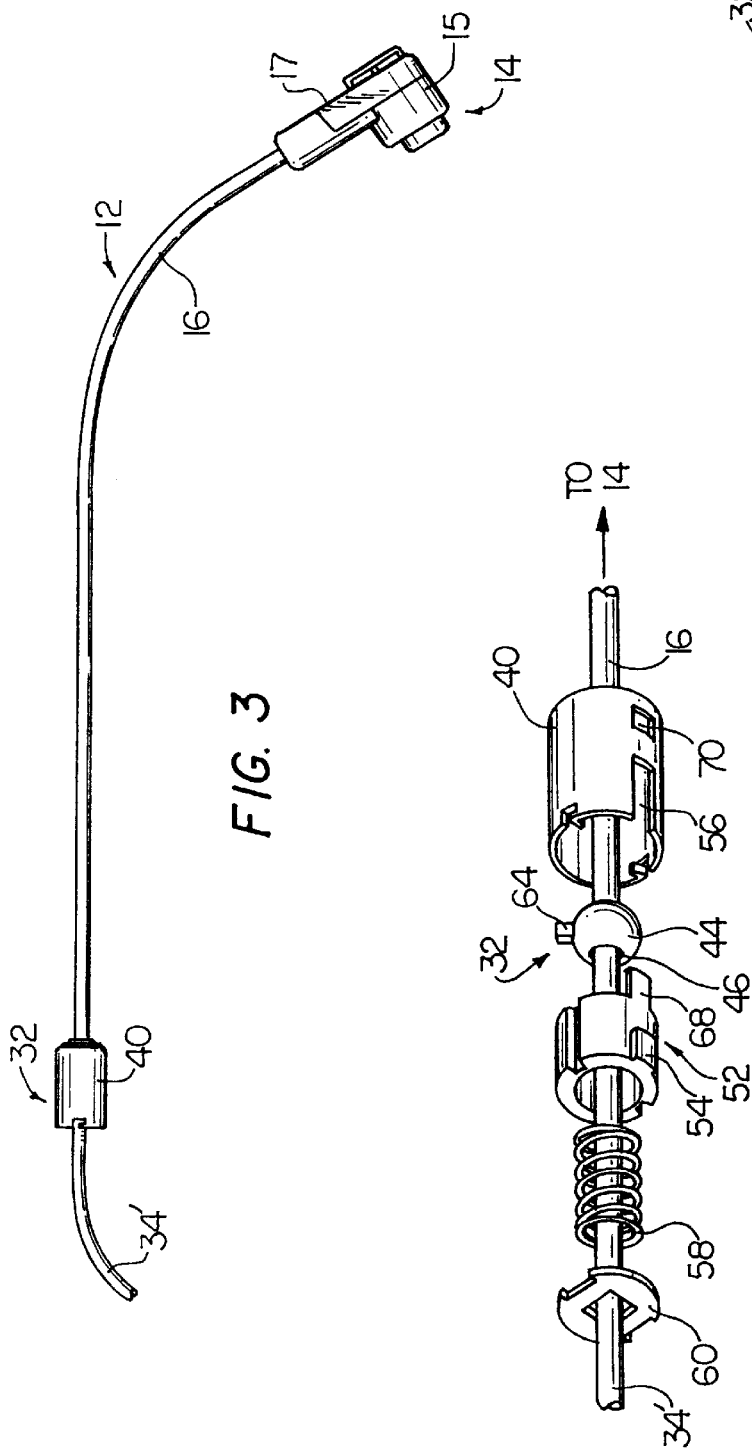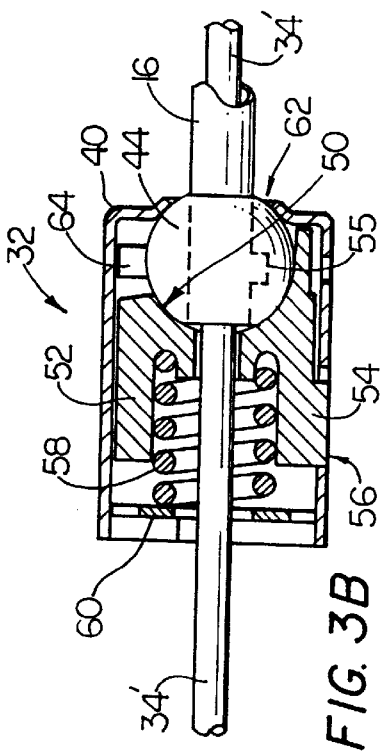

ADJUSTABLE TELEPHONE HEADSET

This application is a continuation of application Ser. No. 08/505,115, filed Jul 21, 1995, now abandoned, which is a division of application Ser. No. 08/231,981, filed Apr. 21, 1994, now U.S. Pat. No. 5,446,788, which was a continuation of Ser. No. 07/952,967, filed Sep. 29, 1992, now abandoned.

FIELD OF THE INVENTION

The invention relates to the field of telephone headsets and more particularly to telephone headsets having an ear support.

BACKGROUND OF THE INVENTION

Telephone headsets permit the use of a telephone microphone and earphone while freeing the user's hands for other activities such as note taking and computer keyboard entry. The earliest forms of headsets included an earphone portion which included an over-the-head band which positioned a speaker adjacent the ear of a user and a microphone portion which rested on the user's chest and which included a "horn" to conduct sound from the user's mouth to the microphone. As the technology progressed, the headsets became smaller and lighter and the modern headset now includes a ear support portion which rests on the ear of a user and which positions an earphone against the ear of a user without the use of an over-the-head band. The microphone portion of a modern headset may include a microphone at the end of a boom attached to the ear support, or alternatively the microphone may be positioned within the ear support and sound brought to it from the user's mouth by way of a hollow boom.

The concern today is to make the headset as non-intrusive and comfortable as possible. In such an attempt to make the new headsets more comfortable, the ear support has been contoured to better fit between the pinna of the ear and the mastoid process of the skull and has been made to adjust to a wide variety of ear sizes. However, the boom microphone and the electrical cable apply torques to the ear support which tends to dislodge the headset from the ear of the wearer. This tendency reduces the comfort level of the wearer.

The present invention provides a headset in which the ear support is adjustable to fit a variety of ear sizes without affecting the balance of the ear support on the ear of the wearer.

SUMMARY OF THE INVENTION

The invention relates to telephone headsets having an ear support, earphone and boom microphone. In one embodiment the headset is configured with an adjustable ear support to fit a variety of ear sizes without affecting the balance of the ear support on the ear of the wearer. One aspect of the invention is that the ear support includes a rotational hinge which is biased into a given position by a compression washer, thereby providing a durable joint.

Another aspect of the invention is that the earphone is removably and adjustably attached to a mounting ring. The earphone includes a housing which includes detents which engage a channel in the mounting ring to permit the earphone to rotate within the mounting ring.

Yet another aspect of the invention is that the mounting ring is movably attached to the ear support by a spring biased ball and socket joint. The combination of flexible joints and removability of the earphone provides the degrees of freedom necessary to permit the earphone to be worn comfortably on either ear of the wearer. The earphone is biased toward the plane of the head to provide good acoustic coupling with the ear.

Still another aspect of the invention is that a strain relief for the electrical connections is attached to the earphone which directs the electrical connections toward the plane of the head. This configuration eliminates a torque which otherwise would tend to dislodge the ear support from the ear of the wearer.

Still yet another aspect of the invention is that the earphone housing, which is sized for the ear, includes a series of openings in its rear surface to maximize its acoustic performance.

Another aspect of the invention is that the boom microphone includes a spring biased ball and socket joint to movably fix the orientation of the microphone with respect to the wearer. The boom microphone ball and socket joint is configured with a tab and stop to prohibit 360 degree rotation of the boom thereby to prevent strain on the electrical connections to the microphone. The spring biased ball and socket joint provides long-term position retention.

BRIEF DESCRIPTION OF THE DRAWING

Other features and benefits of the invention can be more clearly understood with reference to the specification and the accompanying drawings in which:

FIG. 2 is a perspective view of the boom microphone and earphone portion of the embodiment of the invention shown in FIG. 1;

FIG. 2a is a side view of the boom microphone and earphone portion of the embodiment of the invention shown in FIG. 1;

FIG. 3 is a side view of the boom microphone portion of the embodiment of the invention shown in FIG. 1;

FIG. 3a is an exploded diagram of the ball joint of the boom microphone portion of the embodiment of the invention shown in FIG. 3;

FIG. 3b is a cross-sectional diagram of the ball joint of the boom microphone portion of the embodiment of the invention shown in FIG. 3;

DESCRIPTION OF THE PREFERRED EMBODIMENT

Figure 1:
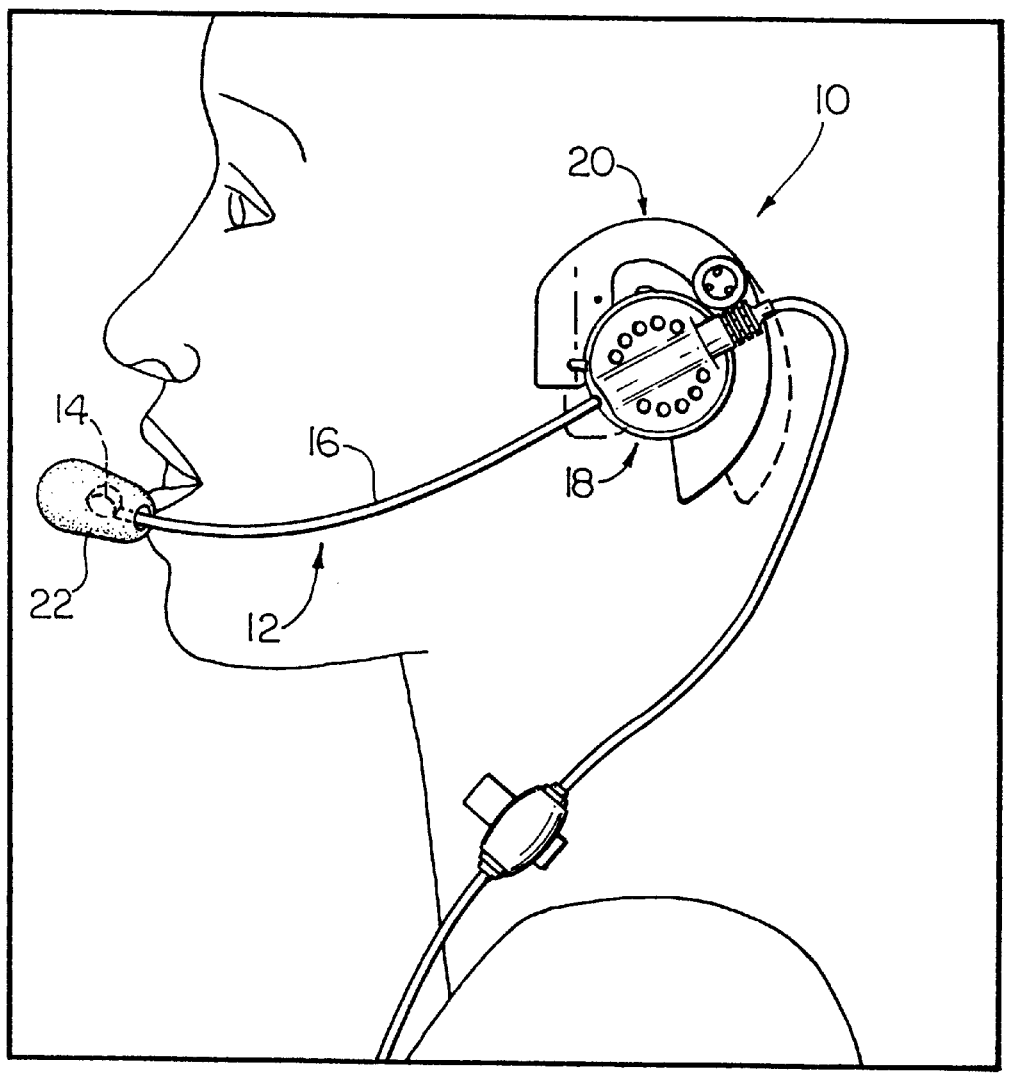
FIG. 1 is a drawing of an embodiment of the telephone headset of the invention positioned on the head of a wearer.

In brief overview, and referring to FIG. 1, a telephone headset 10 constructed in accordance with the invention, includes a boom microphone portion 12; a earphone portion 18; and an ear support portion 20. The boom microphone portion 12 includes a microphone portion 14 (shown in phantom enclosed in a foam shield 22) positioned at one end of a hollow microphone boom 16. The other end of the microphone boom 16 is movably attached to the earphone portion 18. The ear support portion 20, which is removably attached to the earphone portion 18, rests on the operator's ear in a manner that positions the earphone portion 18 adjacent the operator's ear and the microphone portion 14 adjacent the operator's mouth.

Referring to FIGS. 2 and 2a, the microphone boom 16 is attached to one side of an earphone housing assembly 30 of the earphone portion 18 by a ball joint assembly 32 about which more will be said below. Electrical signals are supplied to the earphone portion 18 and received from the boom microphone portion 12 by way of a multiconductor wire 34 which enters the earphone housing assembly 30 through a strain relief 36.

Referring also to FIGS. 3, 3a and 3b, the ball joint assembly 32 of the boom microphone portion 12 includes a cup-shaped canister 40, through which the microphone boom 16 passes, which retains the other components of the ball joint assembly 32 and anchors the ball joint assembly 32 to the earphone portion 18. A ball 44 of plastic is molded to the end of the microphone boom 16 opposite to the end of the microphone boom 16 to which the microphone portion 14 is attached. The end of the microphone boom 16 to which the ball 44 is attached includes two tabs 55 (one shown in phantom in FIG. 3b) formed from a flat bar welded to the boom, which prevent the ball 44 from rotating on the microphone boom 16. The ball 44 has a hollow diameter 46 which permits wires 34' to pass through the ball 44 and the microphone boom 16 to the microphone portion 14.

The microphone portion 14 includes a plastic forward housing 15 which is molded to the other end of the microphone boom 16. Once the wires enter the forward housing 15, the opening to the microphone boom 16 is sealed with a low viscosity RTV plastic to prevent acoustic waves from traveling up the microphone boom 16. When the microphone electronics (not shown) have been electrically connected to the wires from the microphone boom 16, the rear cover 17 of the microphone portion 14 is attached to the forward housing 15.

When assembled, the ball 44 rests against a cup portion 50 of a socket assembly 52 thus forming a ball and socket joint. The socket assembly 52 includes a tab 54 which engages a slot 56 in the wall of the canister 40 and prevents the socket assembly 52 from rotating with the ball 44. A spring 58, retained within the canister 40 by a retaining plate 60, biases the socket assembly 52 toward the ball 44. The ball 44 is pressed, between the cup portion 50 of the socket assembly 52 and the partially closed end 62 of the canister 40, with a force sufficient to maintain a given orientation of the microphone boom 16 with respect to the canister 40, when the microphone boom 16 is positioned by the operator. The ball 44 includes a tab 64 extending radially from the outer surface of the ball 44. This tab 64 abuts a rotation preventing tab 68 of the socket assembly 52 as the microphone boom 16 is rotated a predetermined amount, thus preventing full 360 degree rotation of the microphone boom 16. Complete rotation is prevented so that the multiconductor wire 34', entering the microphone boom 16, is prevented from twisting and breaking.

Figure 4:
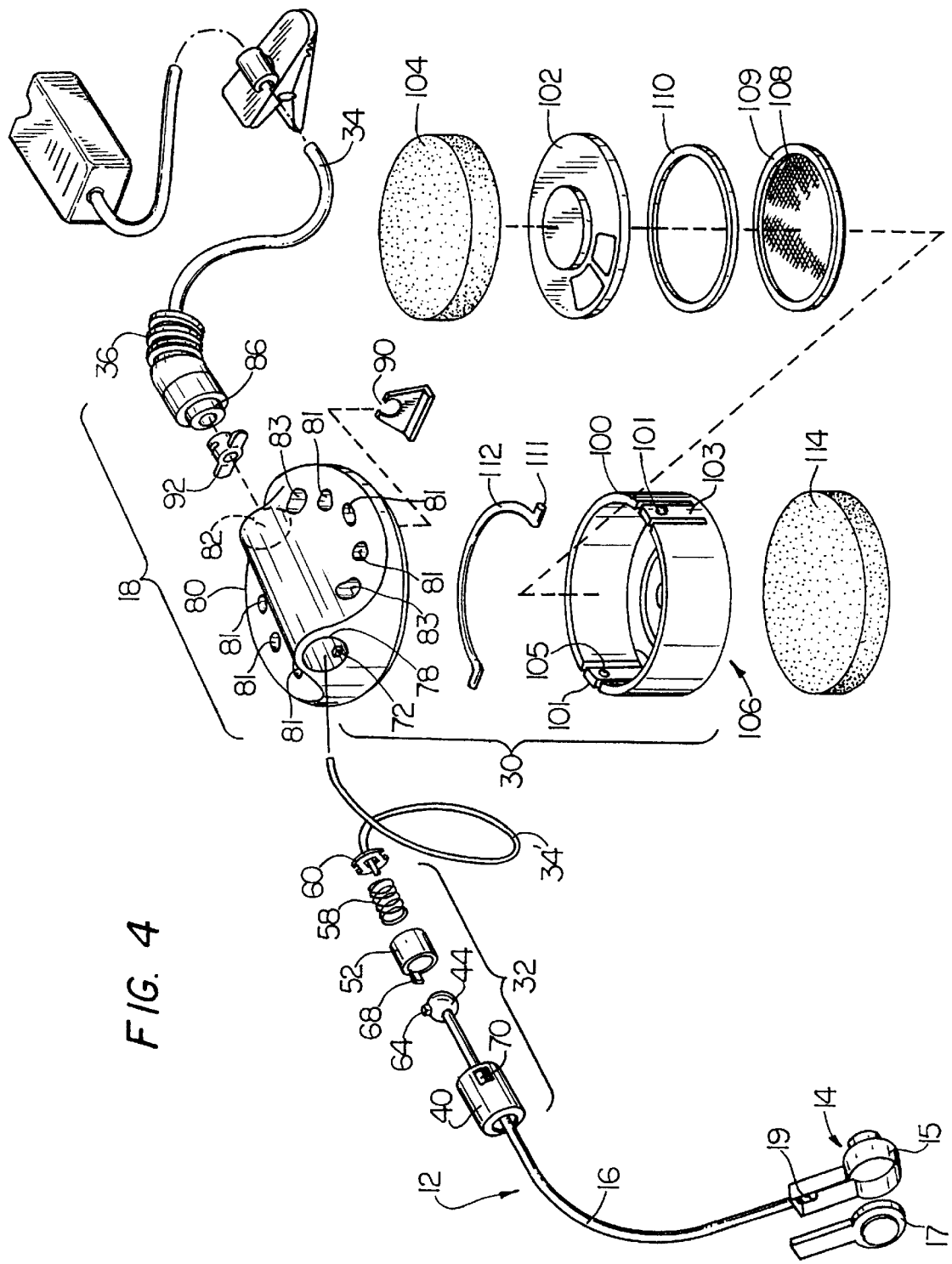
FIG. 4 is a diagram of an exploded view of the boom microphone and earphone portion of the embodiment of the invention shown in FIG. 1.

Referring also to FIG. 4, the canister 40 fits into a canister opening 78 in the rear cover 80 of the earphone housing assembly 30. A canister locking tab 72 in the canister opening 78 engages a canister locking cavity 70 in the canister 40, and prevents the canister 40 from rotating within the canister opening 78.

The forward portion 86 of the strain relief 36 engages a strain relief opening 82 (shown in phantom) opposite the canister opening 78 in the rear cover 80 of the earphone housing assembly 30. Once the forward portion 86 of the strain relief 36 is positioned in the strain relief opening 82, a strain relief clip 90 retains the forward portion 86 of strain relief 36 within the rear cover 80 of the earphone housing assembly 30. A wire-retainer 92 holds the wire 34 within the strain relief 36. The shape of the strain relief 36 is such that the wire 34 is angled toward the plane of the head adjacent the ear in order to prevent the wire 34 from extending beyond the plane of the pinna of the ear of the wearer. This reduces the torque on the ear support portion 20 which would tend to dislodge the ear support portion 20 from the ear.

The earphone housing assembly 30 is formed by the attachment of a forward housing 100 to the rear cover 80. The rear cover 80 includes a series of openings 81 which provide the proper acoustic impedance for high speaker efficiency and frequency response while also providing good high voltage breakdown protection. Additional openings 83, which are not through holes, provide aesthetic design without affecting acoustic impedance and without providing an additional electrostatic breakdown path to the speaker terminals of the headset. An earphone speaker 102, with the desired high frequency and low frequency rolloff characteristics, is positioned within the forward housing 100 and isolated from the rear cover 80 by an open foam insert 110. Similarly, the earphone speaker 102 is isolated from the inside surface of the forward face 104 of the forward housing 100 by a cloth dust filter 108 attached to the forward housing 100 by an adhesive ring 109 positioned about the perimeter of the cloth filter 108. The earphone speaker 102 is attached to the housing 100 by an adhesive ring 110. A compressive spring 112, each end of which is seated in a dimple 105 in a respective resilient member 103 in the forward housing 100, biases the resilient members 103 in a radially outward direction.

Figure 5:
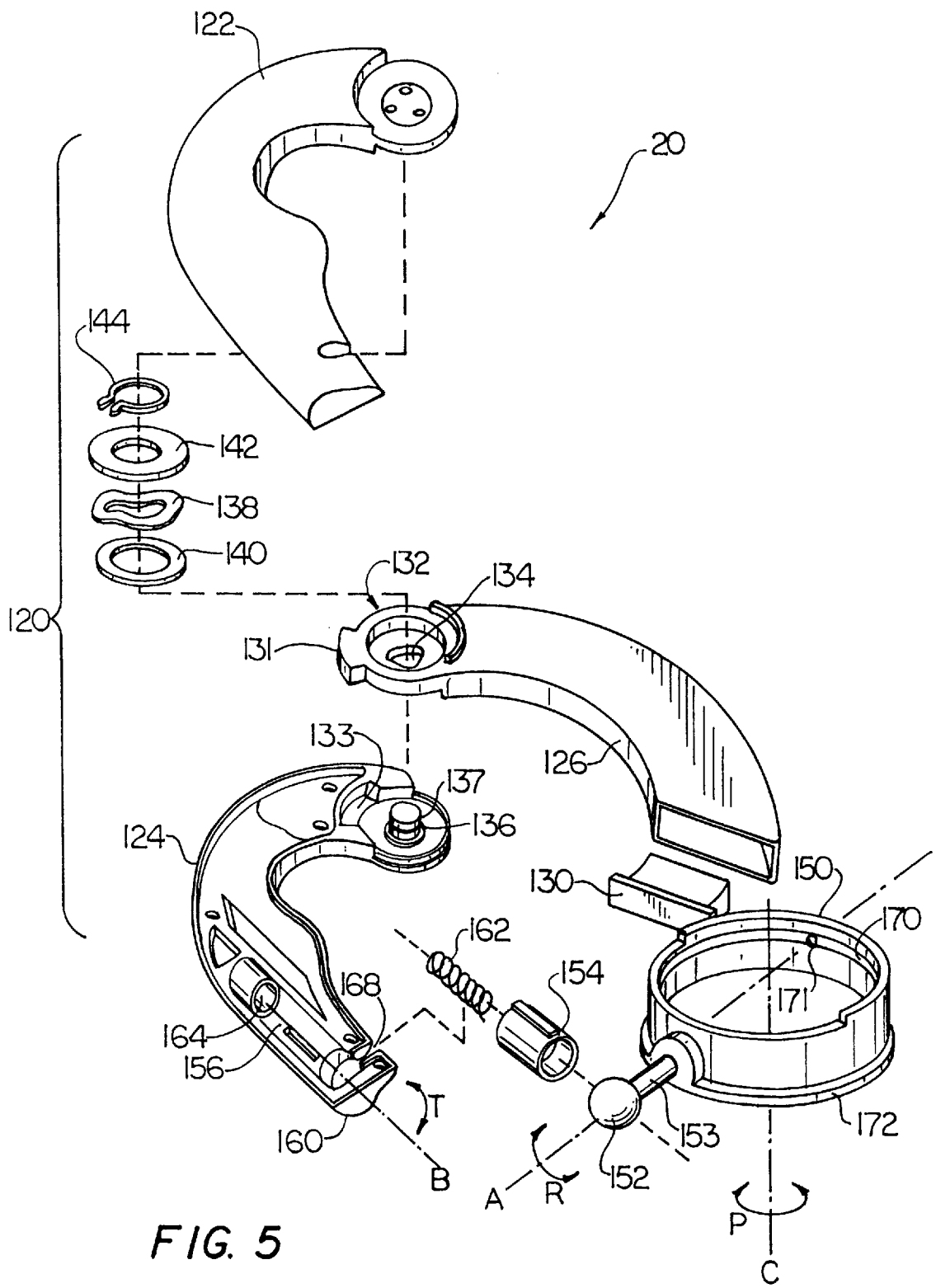
FIG. 5 is a diagram of an exploded view of the ear support portion of the embodiment of the telephone headset of the invention shown in FIG. 1.

Referring to FIG. 5, the ear support portion 20 includes a fixed curvilinear member 120, assembled from a base portion 124 and a cover 122, and a hollow adjustable curvilinear member 126 having an end cover 130 and an engagement portion 132 defining a hole 134. One end of the base portion 124 includes a metal shaft 136, upon which the hole 134 of the engagement portion 132 is located and about which the adjustable curvilinear member 126 rotates. The engagement portion 132 of the adjustable curvilinear member 126 also includes a rotation tab 131. The rotation tab 131 rests in a rotation tab recess 133 when the engagement portion 132 of the adjustable curvilinear member 126 is positioned on the metal shaft 136. The interaction of the engagement tab 131 and the engagement tab recess 133 restricts the amount the adjustable curvilinear member 126 can rotate about the metal shaft 136 and hence limits how far the ear support 20 can be opened. This limitation prevents the ear support 20 from opening too far and thus aids the operator in positioning the ear support 20 on the ear.

The adjustable curvilinear member 126 is retained on the metal shaft 136 of the base portion 124 by the cover portion 122. To permit the adjustable curvilinear member 126 to be maintained in any orientation relative to the fixed curvilinear member 120, the engagement portion 132 of the adjustable curvilinear member 126 is biased against the base portion 124 of the fixed curvilinear member 120 by a compression washer 138 located between two washers 140, 142 and held on the metal shaft 136 by a clamp ring 144 positioned in a groove 137 in the metal shaft 136. The use of the compression washer 138 permits the easy adjustment of the adjustable curvilinear member 126 relative to the fixed curvilinear 120 while permitting the orientation to be maintained once the relative positions have been adjusted. In one embodiment, the compression washer 138 is chosen to provide about 5.5 inch-oz. of force.

The earphone portion 18 is attached to the ear support portion 20 by means of a mounting ring 150, into which fits the forward housing 100 of the earphone housing assembly 30. Extending radially outwardly from the circumference of mounting ring 150 is a ball 152 at the end of a ball stem 153. The ball 152 in conjunction with a cup socket 154 forms a ball and socket joint which permits rotation (Arrow R) of the mounting ring 150, and hence the earphone housing assembly 30, about an axis A of the ball 152. The ball 152 and cup socket 154 are positioned within the base portion 124 in a channel 156. The ball 152 and cup socket 154 are biased toward one outer end 160 of the base portion 124 by a spring 162. One end of the spring 162 is held in a spring retainer 164 at one end of the channel 156. The other end of the spring 162 is retained by the cup socket 154. A notch 168 in the base portion 124 permits the ball and socket joint formed of the ball 152 and cup socket 154 to rotate (Arrow T) about the long axis B of the base portion 124 without interference from the ball stem 153. In one embodiment, the combination of stiction produced by the ball 152 and cup socket 154 and the resiliency of the ear of the operator produces a force of about 2 oz. holding the ear support 20 on the ear of the operator and providing good acoustic coupling to the ear.

It is the ability of the mounting ring 150 to rotate about both axes A and B, which contributes the same headset to be used on either ear. In addition, the forward housing 100 includes a pair of detents 101, each mounted on the outwardly resilient member 103, which engage a channel 170 along a portion of the inner circumference of the mounting ring 150. This engagement permits the forward housing 100 to rotate (Arrow P) about an axis C perpendicular to the plane of the mounting ring 150. Depressions at each end of the channel 170 engage the detents 101 at the limit of travel and prevent full 360 degree rotation about axis C.

By removing the earphone portion 18 from the mounting ring 150 and rotating the mounting ring 150 one hundred and eighty degrees about axis A prior to reinserting the earphone portion 18 into the mounting ring 150, the wearer is permitted to change upon which ear the headset is worn. The ability to rotate the earphone portion 18 about the B and C axes provides the additional degrees of freedom which permit the telephone headset 10 to be worn comfortably on either ear while still permitting the microphone 14 to be positioned adjacent the mouth of the wearer.

An external open foam ear cushion 114 (FIG. 4) may be attached to the outside surface of the forward housing 100 by fitting the ear cushion 114 over a lip 172 located on the forward outside perimeter of the mounting ring 150.

Figure 6:
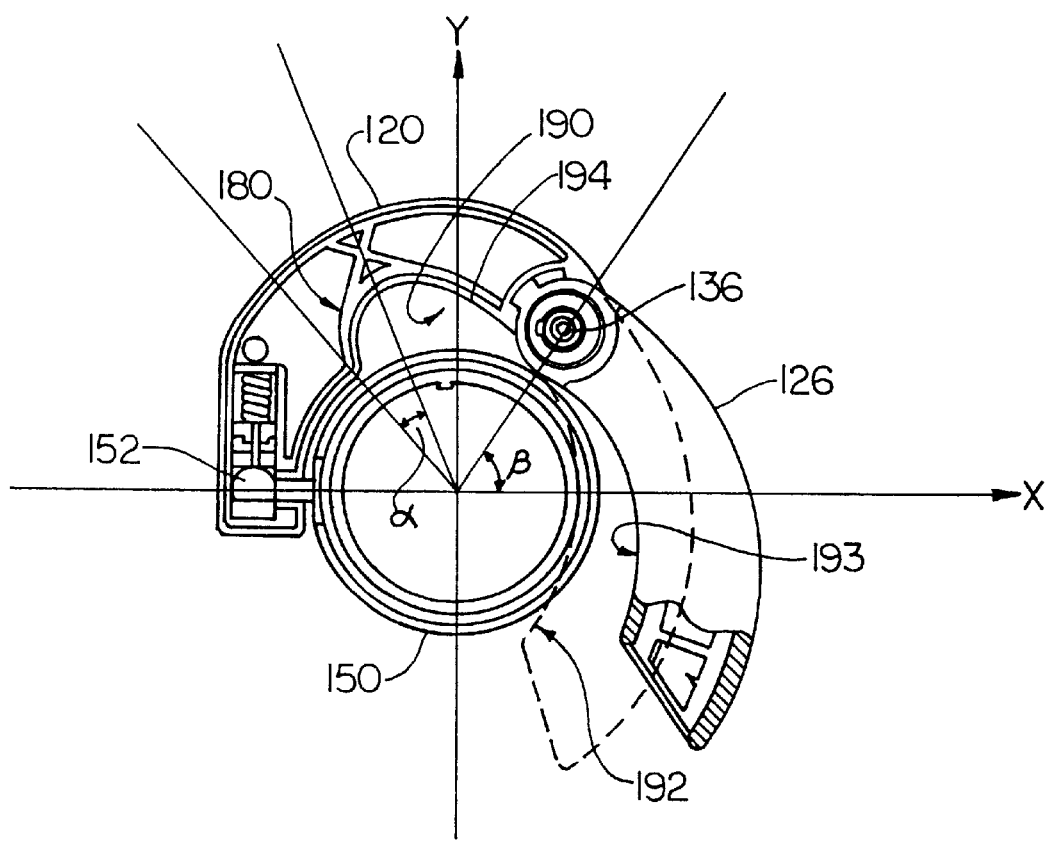
FIG. 6 is a cross-sectional diagram of the ear support portion of the embodiment of the telephone headset of the invention shown in FIG. 5.

Referring to FIG. 6, the ear support portion 20 is precisely shaped for comfort. Aligning the ear support portion 20 such that the axis of the ball stem 152 defines an x-axis and a perpendicular line through the center of the mounting ring 150 defines a y-axis, one extreme 180 of the inner curved surface 190 subtends an angle $\alpha$ and the metal shaft 136 is located at an angle $\beta$ with respect to the positive x-axis. When in its most closed position (shown in phantom 192), the inner surface 193 of the adjustable curvilinear member 126 forms a continuous curve with other extreme 194 of the inner curved surface 190.

The combination of all the features of the telephone headset 10 herein described produces an extremely comfortable and individually adjustable headset.

These and other examples of the concept of the invention illustrated above are intended by way of example and the actual scope of the invention is to be determined solely from the following claims.

We claim:

1. An articulated headset support, to be worn on an ear, comprising:

a main housing having an arcuate surface that rests on top of the ear and extends to the back of the ear behind the pinna;

a secondary housing having an arcuate surface that adjustably contacts the lower-back portion of the ear behind the pinna; and friction hinge means for pivotally connecting said main housing in frictional communication with said secondary housing via a compression member, said hinge means being located behind the pinna at the back of the ear, said hinge means allowing the position of the main housing to be adjusted with respect to the secondary housing to permit the respective arcuate surfaces to be drawn closer together in a clamping motion;

an engagement tab limiting adjustment of said pivotal connection to a range in an engagement tab recess so that a tight fit around the ear is achieved thereby providing enhanced stability.

2. An articulated headset support, to be worn on an ear, comprising:

a main housing having an arcuate surface that rests on top of the ear and extends to the back of the ear behind the pinna;

a secondary housing having an arcuate surface that adjustably contacts the lower-back portion of the ear behind the pinna; and biased hinge means for pivotally connecting said main housing in frictional communication with said secondary housing via a compression member, said hinge means being located behind the pinna at the back of the ear, said hinge means allowing the position of the main housing to be adjusted with respect to the secondary housing to permit the respective arcuate surfaces to be drawn closer together in a clamping motion;

an engagement tab limiting adjustment of said hinge means to a range in an engagement tab recess so that a tight fit around the ear is achieved thereby providing enhanced stability.

* * * * *